May 13, 1958 W. S. WOOD 2,834,172
APPARATUS FOR HARVESTING CASTOR BEANS
Filed Oct. 19, 1955 8 Sheets-Sheet 1
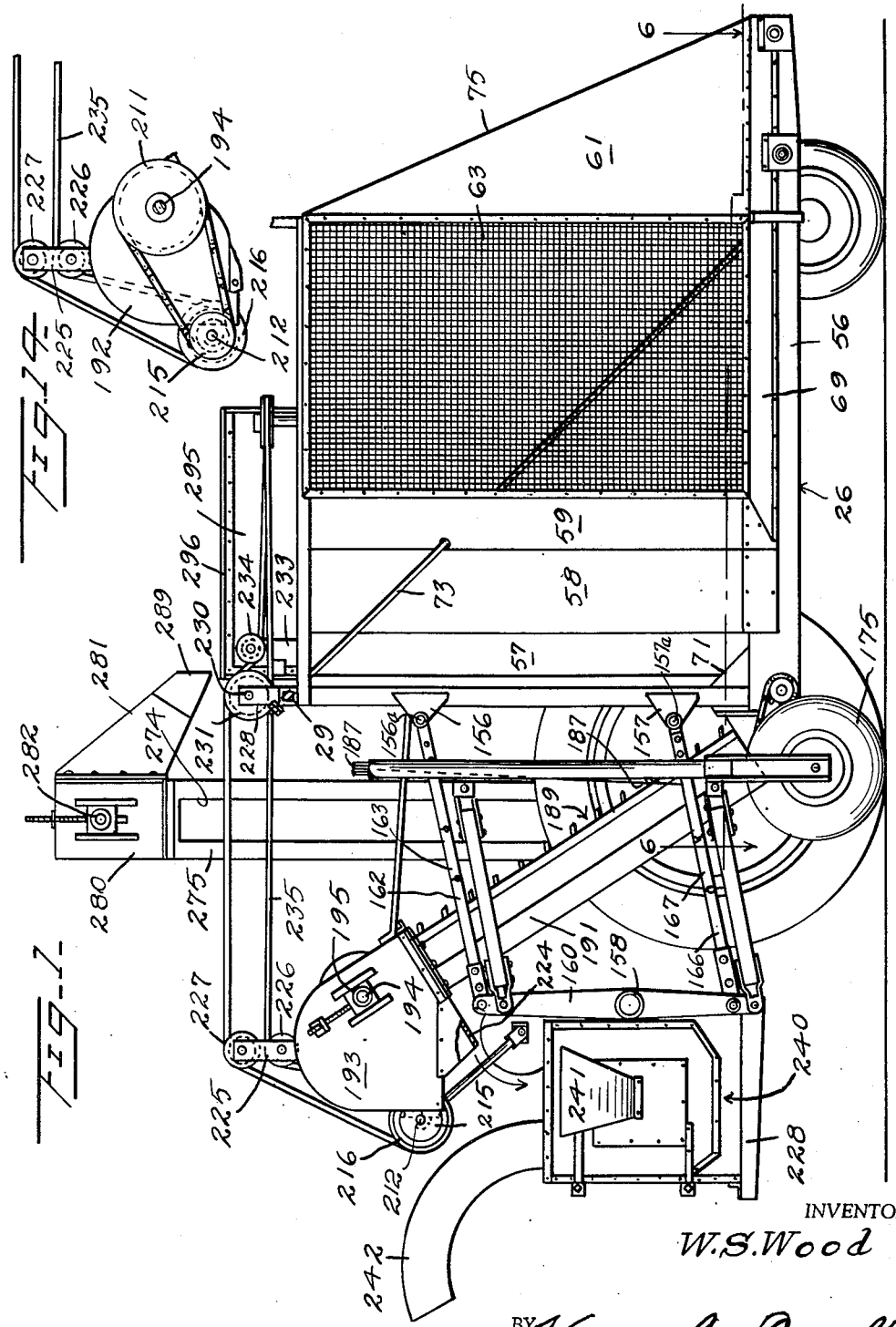
INVENTOR
W. S. Wood
BY Kimmel & Crowell
ATTORNEYS

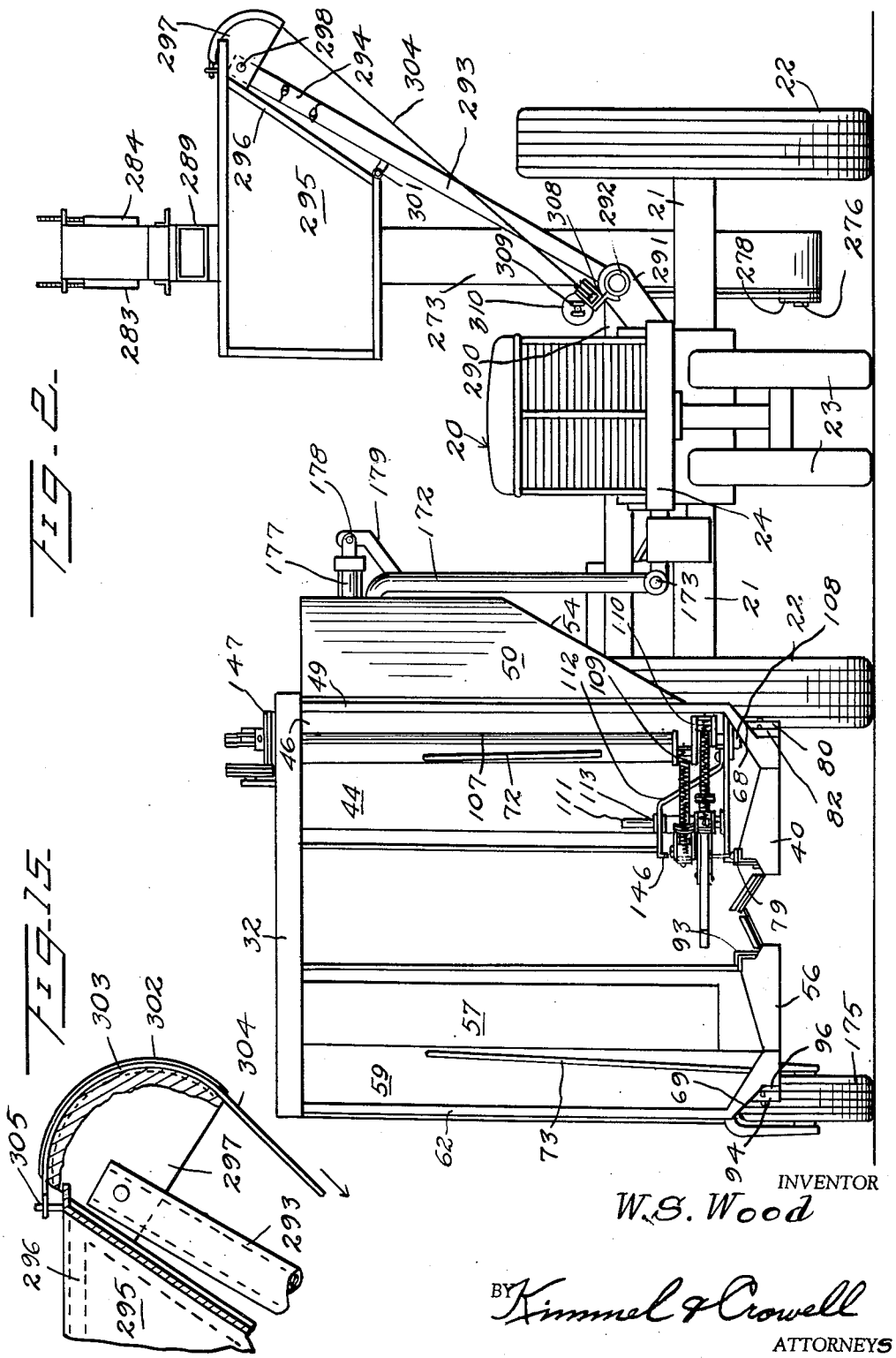

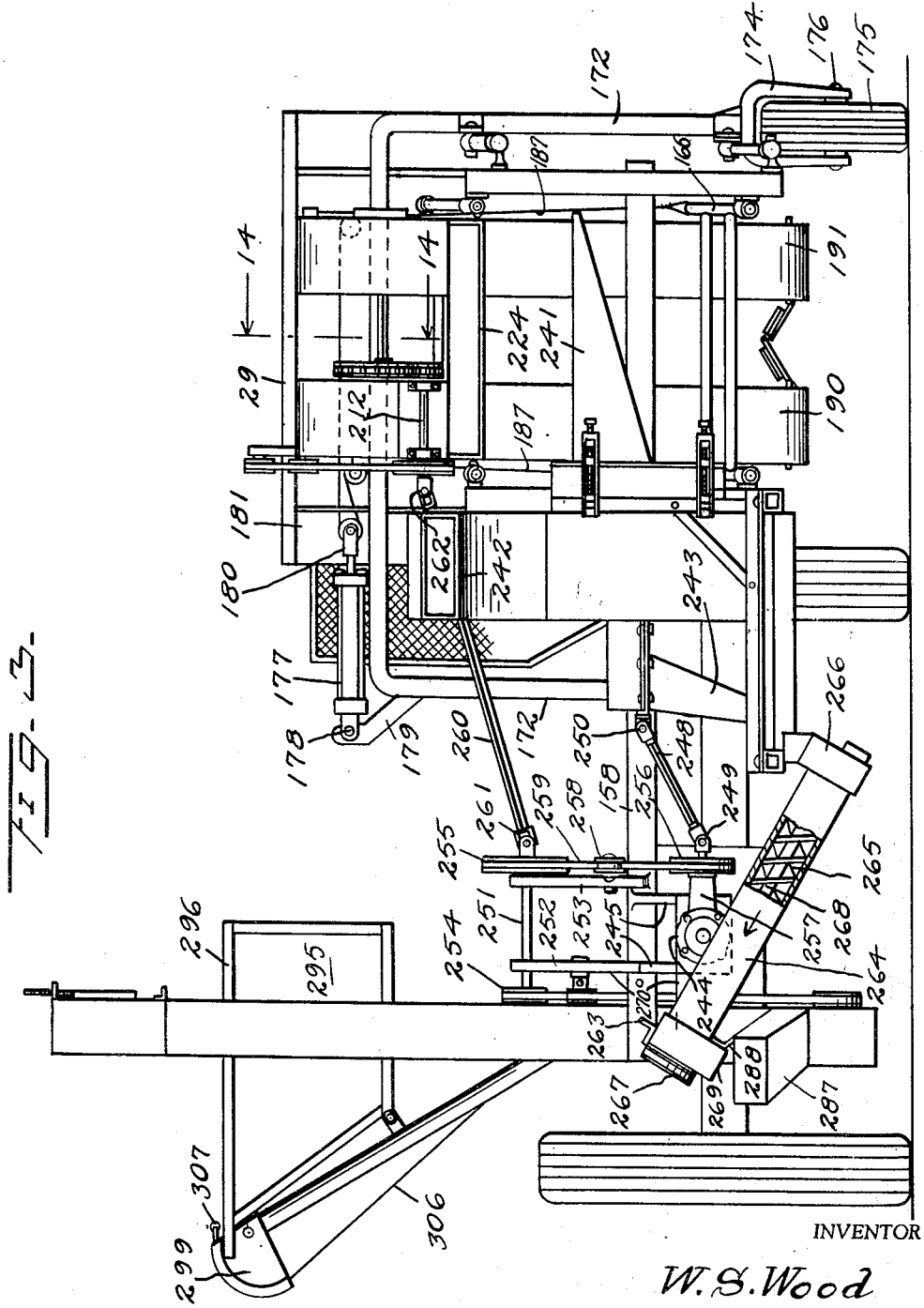

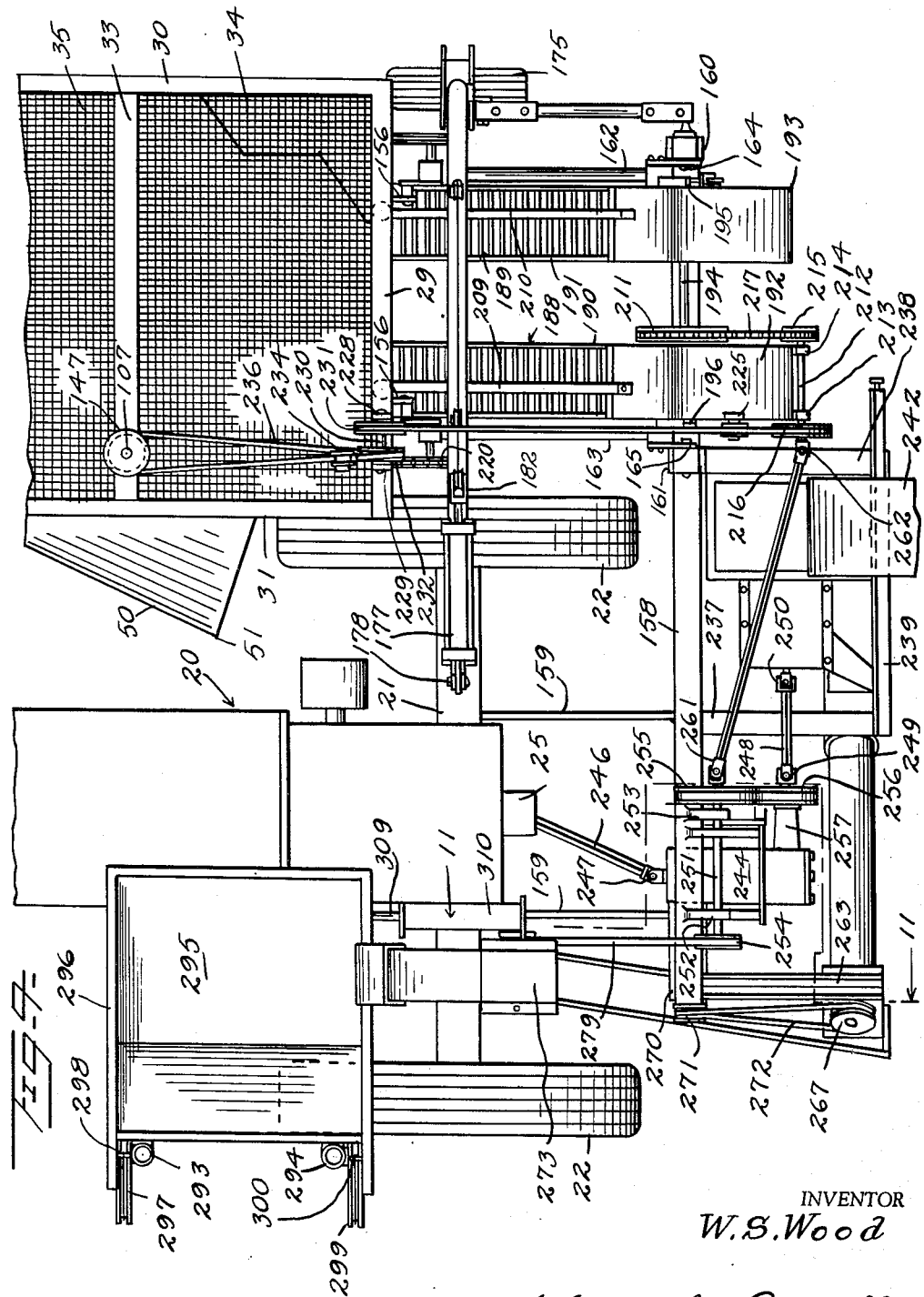

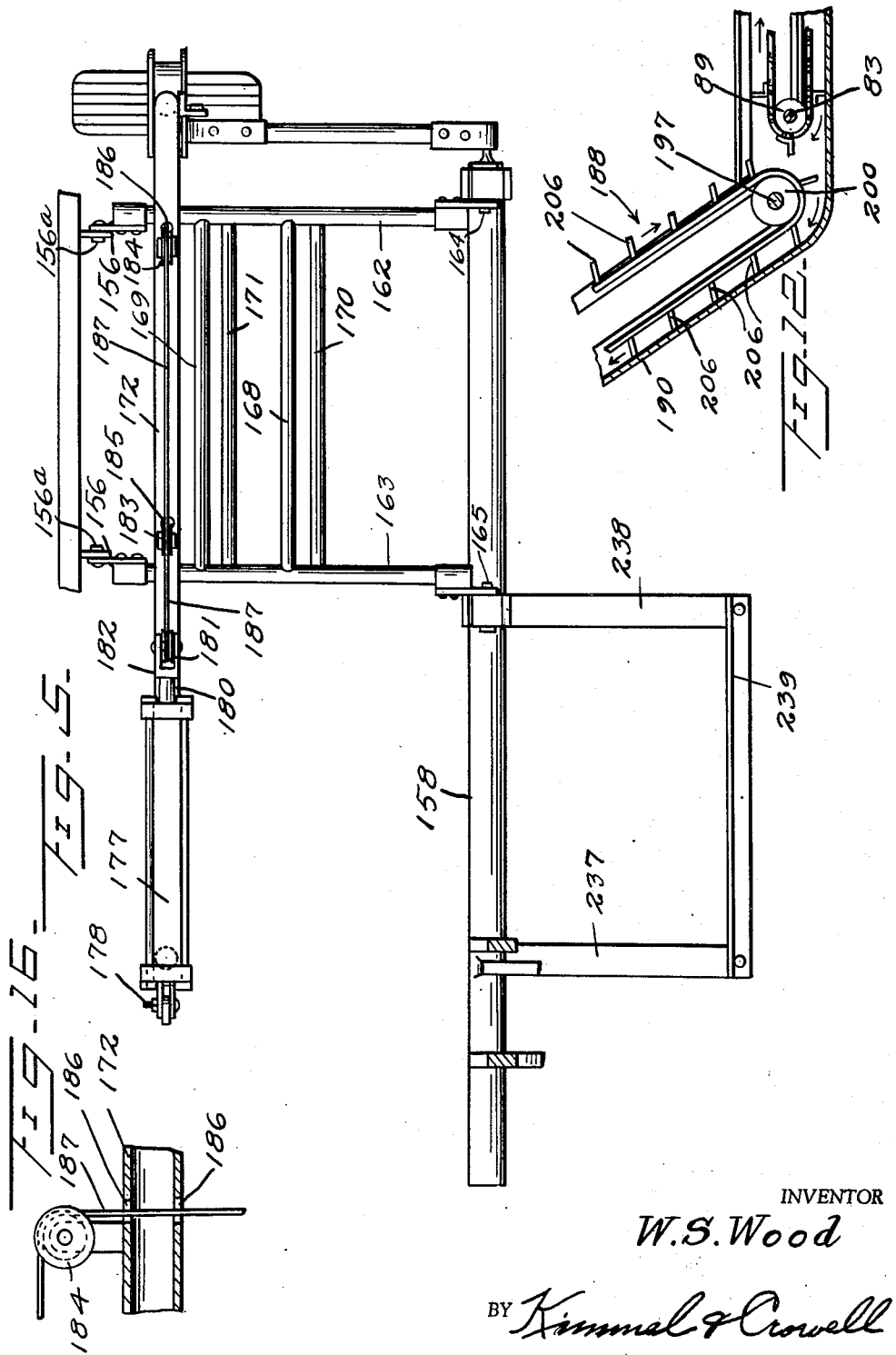

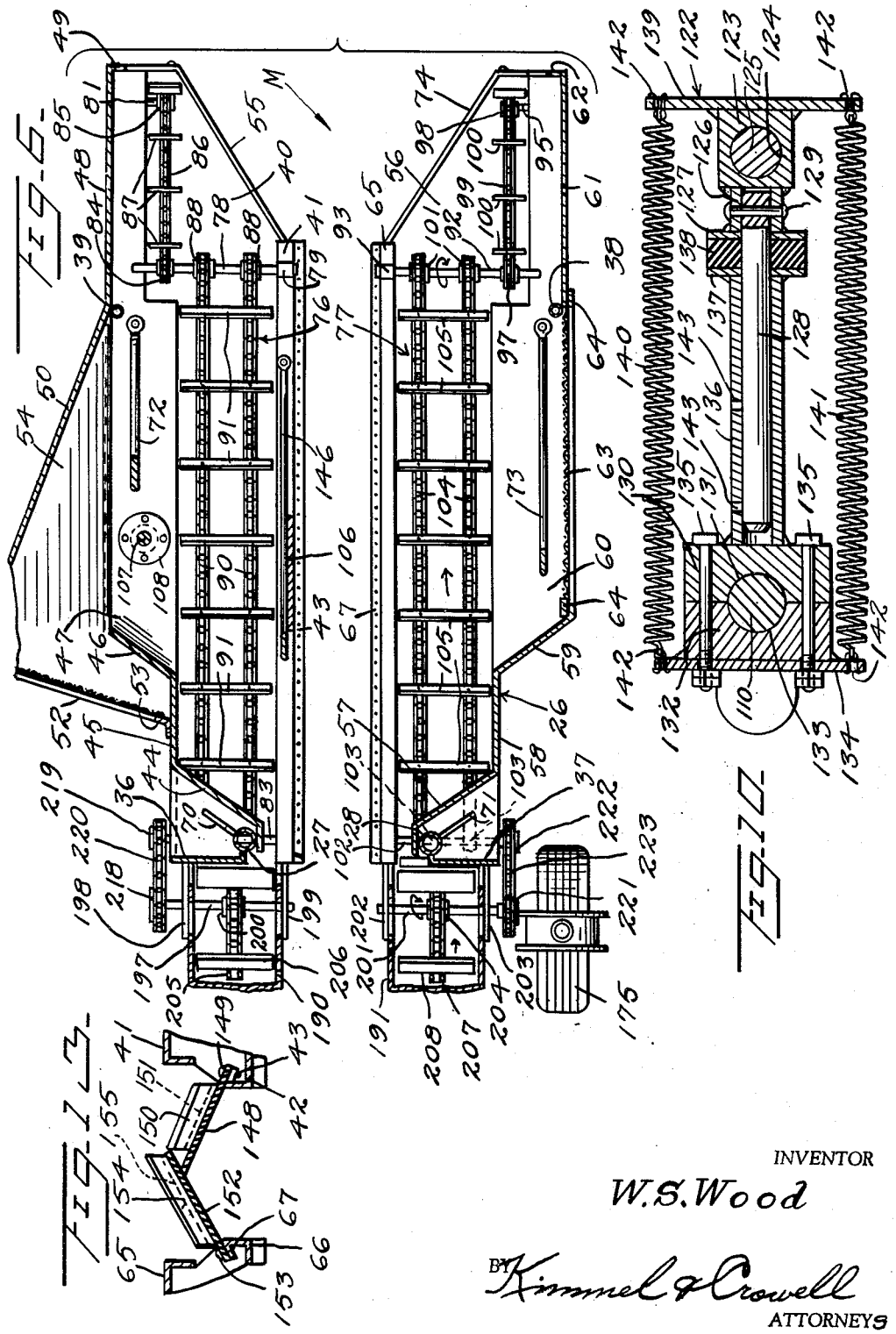

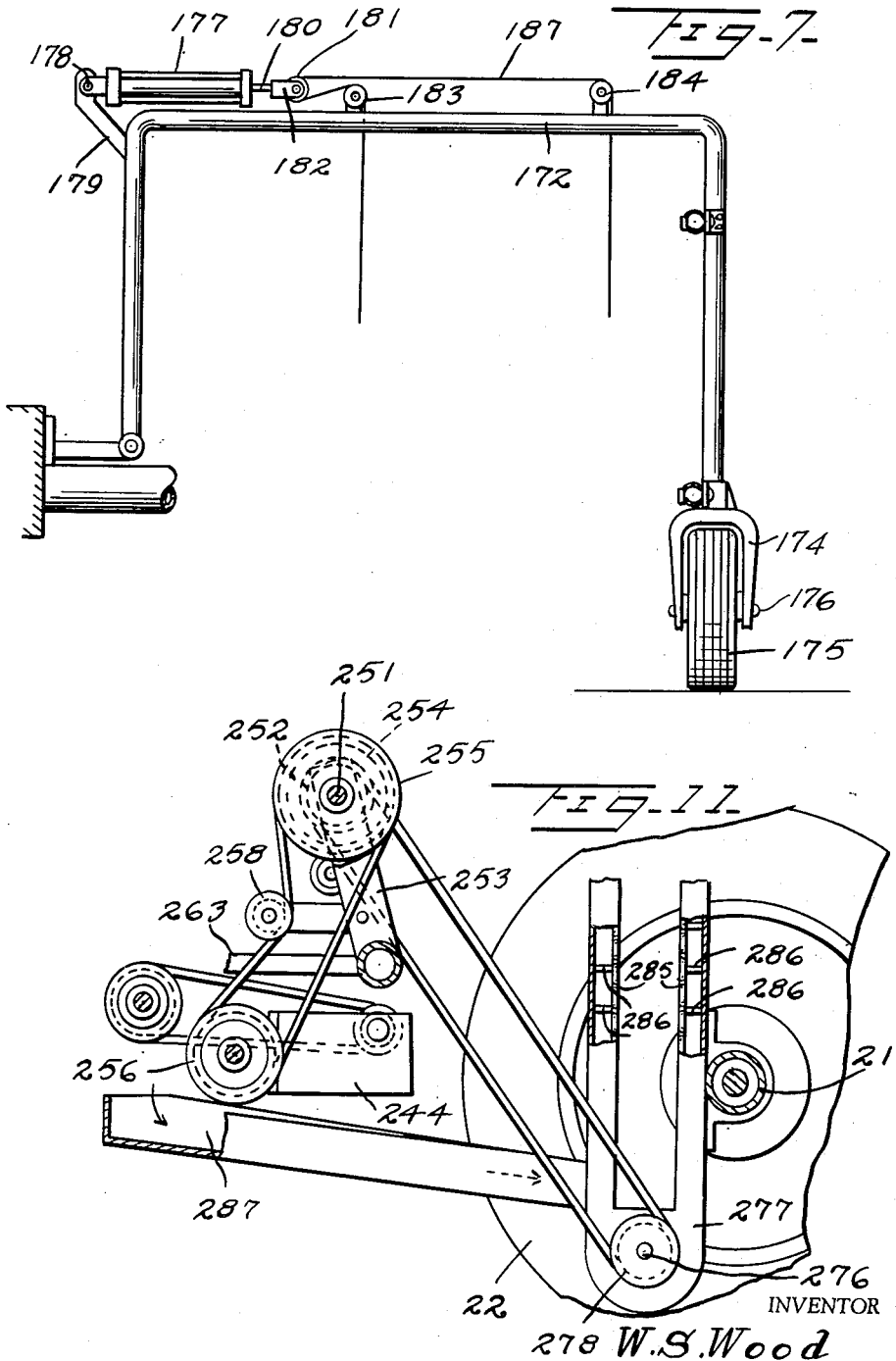

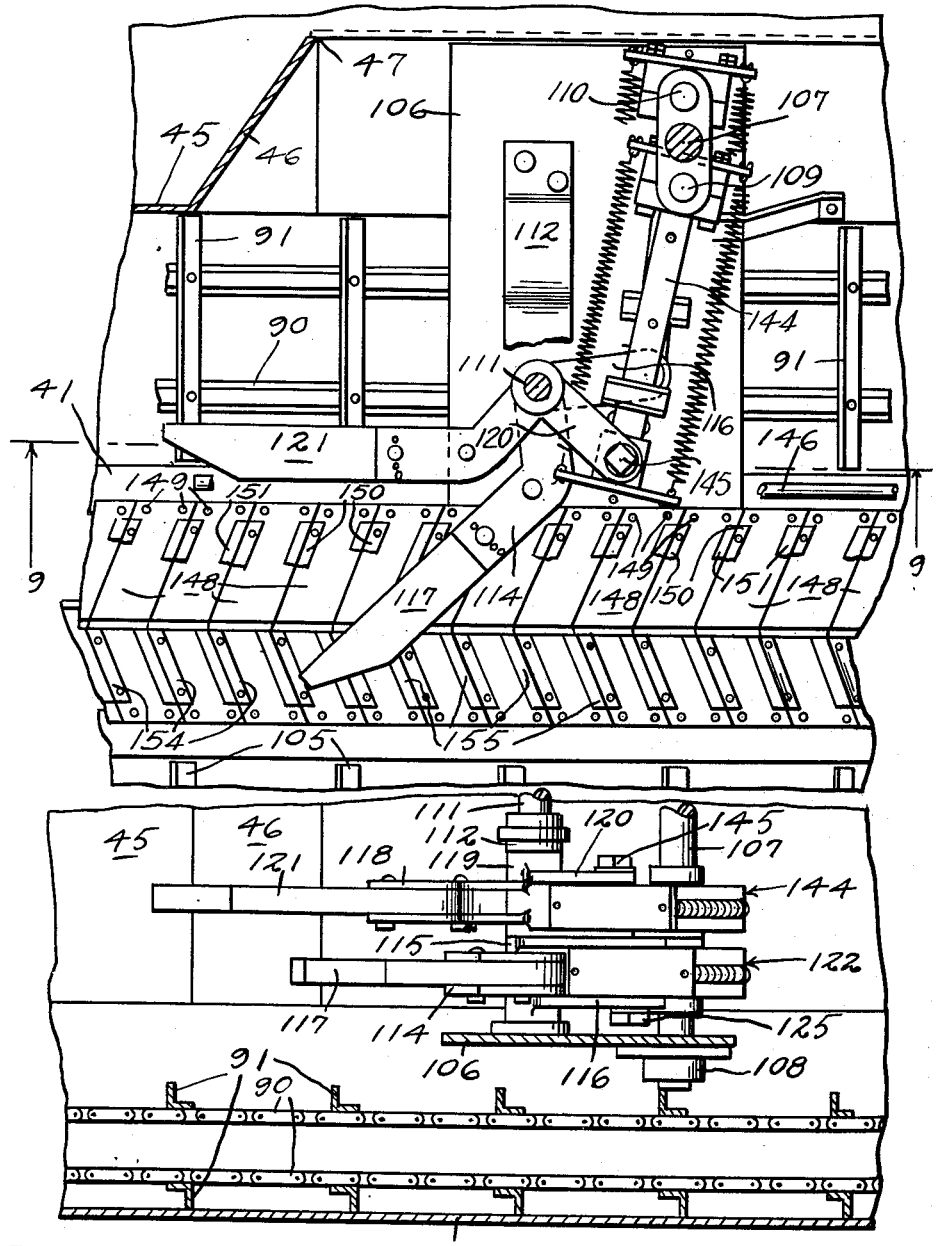

United States Patent Office 2,834,172
Patented May 13, 1958

2,834,172
APPARATUS FOR HARVESTING CASTOR BEANS

William S. Wood, Oklahoma City, Okla., assignor to The Boardman Co., a corporation of Oklahoma Application October 19, 1955, Serial No. 541,368

4 Claims. (Cl. 56—19)

The present invention relates to an apparatus for harvesting castor beans or the like, and more particularly to such harvesting which is accomplished without injury to the plant.

The primary object of the invention is to provide an apparatus for processing castor bean seeds or the like which will produce a clean separation between the seed capsules, other plant material and the castor bean.

Another object of the invention is to provide a mechanical harvester which will leave the plant free of injury and in condition to produce further fruit.

A further object of the invention is to provide a mechanical castor bean harvester that will remove mature castor bean capsules from the plant during the growth of the plant without the necessity of killing or defoliating the plant.

A still further object of the invention is to produce castor bean harvesting machine which can be operated by one man as a tractor attachment to harvest and separate castor beans in a single operation.

Another object of the invention is to produce a castor bean harvesting mechanism which employs mechanical vibration of the plant to remove mature castor bean capsules therefrom.

Other objects and advantages will become apparent in the following specification when considered in the light of the attached drawings, in which:

Figure 1 is a side elevation of the invention shown attached to a tractor;

Figure 2 is a front elevation of the invention shown attached to a tractor with parts broken away for clarity;

Figure 3 is a rear elevation of the invention with parts broken away and in section;

Figure 4 is a fragmentary top plan view of the invention illustrating the drive mechanisms;

Figure 5 is a fragmentary top plan view of the frame supporting linkage;

Figure 6 is a fragmentary longitudinal horizontal cross-section taken along the line 6—6 of Figure 1, looking in the direction of the arrows;

Figure 7 is a fragmentary rear elevation of the frame supporting structure with parts broken away and in section;

Figure 8 is an enlarged fragmentary top plan view of the beater mechanism shown partly in section and partly broken away;

Figure 9 is a longitudinal vertical cross-section taken along the line 9—9 of Figure 8, looking in the direction of the arrows;

Figure 10 is an enlarged horizontal cross-section of one of the connecting rod members;

Figure 11 is a fragmentary side elevation of the drive mechanism shown partly broken away and in section for purposes of clarity;

Figure 12 is an enlarged fragmentary side elevation of the conveyor junction shown partly broken away and partly in section for purposes of clarity;

Figure 13 is an enlarged fragmentary end elevation of the plant seal shown partly in section and partly broken away;

Figure 14 is a longitudinal vertical cross-section of of a portion of the drive mechanism taken along the line 14—14 in Figure 3, looking in the direction of the arrows;

Figure 15 is an enlarged fragmentary detail front elevation of the hopper dumping mechanism shown partly broken away and partly in section for purposes of clarity, and Figure 16 is an enlarged fragmentary detail view of the cable mounting of the frame suspension structure.

Referring now to the drawings in detail wherein like reference numerals indicate like parts throughout the several figures, the reference numeral 20 indicates generally a tractor structure of conventional design provided with a rear axle 21, rear wheels 22, front wheels 23, frame 24 and a power takeoff 25. The structure of the tractor 20 forms no part of my invention, being merely the operating prime mover to which the invention is attached and from which it obtains power.

A harvesting mechanism, generally indicated at 26, is mounted alongside of tractor 20 and consists of a pair of upright frame members 27 and 28, a rear upper cross member 29, forwardly extending upper frame members 30 and 31 and a front upper cross member 32. A center cross member 33 extends between the upper frame members 30 and 31 at a point midway between the cross members 29 and 32. A screen 34 extends between the frame members 30 and 31 and between the cross members 29 and 33. A second screen 35 extends between the frame members 30 and 31 and the cross members 32 and 33.

A vertically extending rear wall 36 is secured to the upright frame member 27 along the inner edge thereof, and to the cross member 29 at the upper edge thereof. A second vertically extending rear wall 37 is secured to the upright frame member 28 along the inner edge thereof and to the cross member 29 at the upper edge thereof. A pair of upright tubular frame members 38 and 39 are secured to the outer opposite edges of the front cross member 32 and extend perpendicularly downwardly therefrom.

A horizontal housing 40 extends longitudinally of the harvester 26 and is supported by the upright rear wall 36, the upright frame member 27, and the forward tubular frame member 39. The housing 40 is braced by an angle iron member 41 extending along the inner longitudinal edge thereof. An inwardly offset lower portion 42 is spaced apart below and parallel to the angle iron member 41 and carries an outwardly extending flange 43 thereon for purposes to be described.

The housing 40 is provided with an angularly offset outer wall 44 spaced forwardly of the upright frame member 27 at its outer edge and extending inwardly and rearwardly on an angle to a position centrally of and adjacent to the upright frame member 27. An outer wall 45 is joined to the forward edge of the angular wall 44 and extends forwardly to an outwardly extending wall 46. The housing 40 diverging outwardly at 47 forwardly of the wall 46 so that the wall 46 forms a rear wall for this offset portion 47 of the housing 40. A forward side wall 48 extends to the front edge of the housing 40 and has an inwardly directed flange 49 extending perpendicular to the wall 48 at the front edge thereof. At the rear edge of the wall 48 an outwardly and rearwardly angle wall 50 extends to a point opposite but spaced from the angular wall 46. The rear edge 51 of the wall 50 is provided with a screen 52 extending at an angle thereto to a point midway of the wall 45 to which it is secured by frame member 53. Walls 44, 45, 46, 48 and 50 extend to the top screening 34 and 35 with the wall 50 extending in offset relation to the top screening 34 and 35, as illustrated in Figure 4.

A bottom wall 54 is secured to the bottom edge of the wall 50 and extends upwardly and outwardly at a substantial angle to the horizontal. The forward inside edge of the housing 40 is forwardly and outwardly sloped, as at 55, to provide a mouth M for the harvester 26. A housing 56 extends longitudinally of the harvester 26 in parallel spaced apart relation to the housing 40 and is formed in a similar but reversed configuration having an outer rear wall 57 extending inwardly on an angle to a position centrally of and adjacent to the upright frame member 28, the wall 57 being identical to the wall 44. The wall 58 extends forwardly of the outer front edge of the wall 57 in parallel relation to the wall 45 and an outwardly extending angular wall 59 is joined to the forward edge of the wall 58 to form a rear wall for an outwardly offset portion 60 of the housing 56. A forward wall 61 extends to the front edge of the harvester 26 and is provided with an inwardly directed flange 62 at the forward edge thereof, the forward wall 61 terminating at its rear edge and secured to a tubular upright frame member 38. The screen 63, having a frame 64, is secured between the front edge of the wall 59 and the rear edge of the wall 61, as illustrated in Figures 1 and 6.

The housing 56 is braced by a longitudinally extending angle iron member 65 which is coextensive and parallel to the angle iron member 41, with the angle iron members 41 and 65 spaced apart for reasons to be later assigned. The housing 56 is provided with an inwardly offset portion 66 having an outwardly directed flange 67 formed on the upper edge thereof parallel to but spaced apart below the angle iron member 65. The offset portions 42 and 66 being spaced apart a distance less than the angle iron members 41 and 65 and being parallel to each other. The offset portions 47 and 60 of the housings 40 and 56, respectively, are provided with inwardly sloped bottom walls 68 and 69, respectively. A brace 70 extends forwardly and outwardly from the upright frame member 27 and is secured along its lower edge to the housing 40, as illustrated in Figure 6.

A brace member 71 extends outwardly and forwardly of the upright frame member 28 and is joined to the housing member 56 at its lower edge, as illustrated in Figures 1 and 6.

A forwardly and downwardly extending brace tension rod 72 is secured at its forward end to the housing 40, and at its upper rear end to the rear cross member 29, as indicated in Figures 2 and 6. A second downwardly and forwardly extending brace tension rod 73 is secured at its forward end to the housing 56 and at its rear end to the rear cross member 29, as illustrated in Figures 1, 2 and 6. The brace tension rod 72 is positioned exteriorly of the walls 44 and 45 and passes through the wall 46 at a position intermediate its ends so as to contact the outermost portion of the housing 40. The brace tension rod 73 is likewise positioned exteriorly of the walls 57 and 58 and passes through the wall 59 at a point intermediate its upper and lower ends so that the rod 73 might contact the outermost portion of the housing 56. The inner forward edge of the housing 56 is forwardly and outwardly sloped as at 74 to form the other side edge of the mouth for the harvester 26.

The forward edge of the forward wall 48 and the forward edge of the forward wall 61 are sloped upwardly and rearwardly at 75, as illustrated in Figure 1. The housings 40 and 56 are provided with identical but reversed conveyor systems, generally indicated at 76 and 77. A shaft 78 is positioned forwardly of the housing 40 and extends transversely thereof, having the inner end supported in a bracket 79 and the outer end in a housing 80, housing 80 and bracket 79 each carrying a bearing (not shown). A stub shaft 81 positioned in the housing 40 forwardly of the shaft 78 and parallel thereto. The stub shaft 81 is carried at its outer end by a bracket 82, as illustrated in Figure 2. A third shaft 83 is positioned at the rear of the housing 40 parallel to the shaft 78 and is supported for rotation therein by suitable bearings (not shown). The shaft 78 carries a sprocket 84 and the stub shaft 81 carries a sprocket 85. A conveyor chain 86 is trained over the sprockets 84 and 85 and carries thereon conveyor flights 87. Shaft 78 is provided with a pair of spaced apart sprockets 88 and the shaft 83 is provided with a pair of spaced apart sprockets 89. A pair of parallel conveyor chains 90 are trained over the sprockets 88 and 89 in spaced apart relation and carry thereon a series of spaced apart flights 91.

The conveyor system 77 includes a shaft 92 extending transversely of the forward portion of the housing 56 in alignment with the shaft 78. The inner end of the shaft 92 is supported by a bracket 93 and the outer end is carried by a housing 94, bracket 93 and the housing 94 having suitable (hidden) bearings rotatably carrying the shaft 92. A stub shaft 95 is positioned parallel to and spaced apart forwardly of the shaft 92 and is rotatably carried by a bracket 96 on its outer end. The shaft 92 is provided with a sprocket 97 and the stub shaft 95 is provided with a sprocket 98. A conveyor chain 99 is trained over the sprockets 97 and 98 and is provided with transversely extending spaced apart flights 100. Shaft 92 is provided with a pair of spaced apart sprockets 101. A shaft 102 is positioned at the rear of the housing 56 in alignment with the shaft 83 carried by suitable bearings (not shown). The shaft 102 is provided with a pair of sprockets 103 which are spaced apart thereon. A pair of conveyor chains 104 are trained in spaced apart parallel relation over the sprockets 101 and the sprockets 103, and have a series of transversely extending flights 105 secured thereto.

A plate 106 is positioned transversely of the housing 40 in engagement with the angle iron 41 at its inner edge and is secured thereto by any suitable means. The outer edge of the plate 106 is in engagement with the upper outer edge of the bottom wall 68 and is secured thereto by any suitable means. A shaft 107 is journalled in the central cross member 33 at the top end thereof and in a bearing 108 at the bottom end thereof carried by the plate 106. The shaft 107 is provided with a pair of oppositely extending vertically spaced apart crank throws 109 and 110.

A stub shaft 111 is secured to the plate 106 and extends upwardly therefrom. A brace 112 is secured to the plate 106 and extends upwardly and inwardly where it is secured at 113 to the upper portion of the shaft 111. A knocker arm 114 carries a tubular journal 115 which is pivotally engaged over the shaft 111. Arms 116 are secured to tubular journal 115 in vertically spaced relation at an angle to the bracket 114. A knocker extension arm 117 is secured in the bracket 114 by any suitable means and extends outwardly therefrom. A second knocker bracket 118 is positioned parallel to and above the bracket 114 and is likewise provided with a tubular journal 119 which is pivotally carried by the shaft 111 above the journal 115 with the journals 115 and 119 in end to end contacting relation. The journal 119 is also provided with a pair of spaced apart arms 120 which extend at an angle to the bracket 118. A second knocker extension arm 121 is carried by the bracket 118 in parallel relation to the bracket extension arm 117. A connecting rod, generally indicated at 122, extends between the arms 116 and the throw 110 of the shaft 107.

The connecting rod 122 is provided with a bushing 123 having a vertical bore 124 extending therethrough. Bushing 123 is positioned between the arms 116 and pivotally secured thereto by means of a detachable pivot pin 125. A tubular boss 126 is secured to the bushing 123 by any suitable means such as welding or the like, and extends outwardly therefrom terminating in a radial flange 127. A shaft 128 is positioned within the tubular boss 126 and is secured therein by a rivet 129, or other suitable means.

A bearing block 130 is provided with a semi-cylindrical bearing surface 131, and a second bearing block 132 is provided with a facing semi-cylindrical bearing surface 133 to form a continuous circular cylindrical bearing opening. A plate 134 is positioned on the surface of the bearing block 132 opposite the bearing surface 133. The bearing block 130, the bearing block 132 and the plate 134 are detachably secured together by means of bolts 135 passing therethrough. A tubular member 136 is secured to the bearing block 130 by any suitable means such as welding or the like and terminates at its outer end in an outwardly directed radial flange 137. The tubular member 136 engages over the shaft 128 and is reciprocably carried thereby. A rubber annular block 138 is positioned on the shaft 128 between the annular flanges 127 and 137 for purposes to be explained.

A plate 139 is secured to the bushing 123 oppositely to the tubular boss 126. Plate 139 and the plate 134 extend laterally beyond the bearing blocks 130, 132 and the bushing 123 and are provided with coil springs 140 and 141 which are secured between opposite ends of the plates 134 and 139 by suitable fastening elements 142.

The tubular member 136 is provided with openings 143 to permit lubrication of the shaft 128 and to prevent the entrapment of air in the tubular member 136. The springs 140 and 141 normally maintain the tubular member 136 on the shaft 128 with the flanges 127 and 137 in engagement with the opposite faces of the annular rubber block 138.

As can be seen in Figure 10, the structure of the connecting rod 122 is such that upon the exertion of excessive strain thereon the connecting rod will elongate against the tension of the springs 140 and 141. Upon the removal of the excess load, the springs 140 and 141 will return the connecting rod to its original unextended condition and the rubber block 138 will prevent any shock as the connecting rod 122 returns to normal.

A second connecting rod, generally indicated at 144, is identical in every respect to the connecting rod 122 and extends between the throw 109 of the shaft 107 and the bell crank arms 120 of the journal 119. A pivot pin 145 extends through the arms 120 and one end of the connecting rod 144 to pivotally secure the connecting rod 144 to the arms 120. The throws 109 and 110 of the crank shaft 107 being opposite, it can be readily seen that upon rotation of the shaft 107 the knocker extensions 117 and 121 will be caused to oscillate about the shaft 111 in such a way that when one of the extensions 117 and 121 is moving outwardly, the other extensions 117 and 121 will be moving inwardly. A brace 146 extends rearwardly from the housing 40 to brace the inner end of the brace 112. The upper end of the shaft 107 is provided with a pulley 147 through which the shaft 107 is driven by means to be explained.

The housing 40 is provided with a multiplicity of resilient extensions 148 which are secured by securing elements 149 to the flange 43 of the offset extension 42. The resilient extensions 148 extend upwardly and inwardly, as illustrated in Figure 13, and rearwardly as illustrated in Figure 8. A metal plate 150 is positioned on each of the resilient extensions 148 and is provided with a rearwardly offset flange 151. The resilient plates 148 are positioned in edge to edge relation and the flange 151 is positioned in spaced apart overlying relation to the next adjacent resilient panel 148.

The housing 56 is provided with a similar series of resilient extensions 152 which are secured to the flange 67 by suitable securing elements 153. Resilient extensions 152 extend upwardly and inwardly as shown in Figure 13, and rearwardly as shown in Figure 8. The resilient members 152 are provided with metal plates 154 having rearwardly offset flanges 155 similar to the flanges 151, and overlie in spaced apart relation the abutting edges of the resilient members 152 in the same manner as the metal plate 150 overlies the resilient members 148. As illustrated in Figure 13, one of the resilient members 152 overlaps the inner end of one of the resilient members 158 to completely close the space between the offset portions 42 and 66. Resilient plates 148 and 152 are adapted to be displaced upwardly in succession by an object passing rearwardly therebetween, as will be more fully explained later.

The upright frame members 27 and 28 are provided with rearwardly extending upper trunnions 156 and spaced apart therefrom rearwardly extending lower trunnions 157.

A tubular cross member 158 is secured by any suitable means such as forward extending members 159 to the axle 21 and frame 24 of the tractor 20. The cross member 158 is positioned rearwardly of the wheels 22 of the tractor 20 and extends laterally to one side thereof to a position behind the harvester 26. The cross member 158 is provided with a pair of spaced apart upstanding arms 160 and 161 which terminate at points substantially spaced above and below the cross member 158, as illustrated in Figure 1.

The upper ends of the arms 160 and 161 are provided with a pair of parallel forwardly extending support arms 162 and 163 which are pivoted at 164 and 165, respectively, to the arms 160 and 161 at their rear ends, and are pivotally secured at 156a to the trunnions 156 at their forward ends. A pair of forwardly extending parallel support arms 166 and 167 are pivotally secured at their rear ends to the lower end portions of the arms 160 and 161, respectively, and have their forward end portions pivotally secured at 157a to the trunnions 157. The arms 162 and 163 are parallel to each other and to the arms 166 and 167 so that a cubical parallelogram is formed thereby. The harvester 26 is carried by the arms 162, 163, 166 and 167. The arms 162 and 163 are connected in parallel relation by frame members 168 and 169 and the arms 166 and 167 connected together in parallel relation by the frame members 170 and 171.

An inverted U-shaped outrigger 172 is pivoted at one end as at 173 to the tractor 20 and carries a fork 174 at the bottom of the other end with a wheel 175 journalled as at 176 therein. A hydraulic cylinder 177 is pivoted at 178 to a bracket 179 extending upwardly from the inner leg of the outrigger 172, with the hydraulic cylinder extending horizontally outwardly therefrom. A piston rod 180 projects outwardly from the hydraulic cylinder 177 and carries a pulley 181 in a yoke 182 on the outer end thereof.

A pulley 183 is mounted on the bight portion of the outrigger 172 and a second pulley 184 is mounted in spaced apart relation to pulley 183 also on the bight portion of the outrigger 172. The outrigger 172 is provided with vertically extending bores 185 and 186 adjacent to the pulleys 183 and 184, respectively, so that a cable 187 may extend over the pulleys 183 and 184, about the pulley 181 and down through the bores 185 and 186 as illustrated in Figure 7. The lower ends of the cable 187 are secured to the arms 166 and 167 so that movement of the pulley 181 in a direction toward the hydraulic cylinder 177 will cause the arms 166 and 167 to be raised at their forward ends, thus raising the harvester 26 with relation to the wheel 175. Conversely, movement of the pulley 181 in a direction away from the hydraulic cylinder 177 will lower the harvester 26 with relation to the wheel 175.

A pair of conveyors, generally indicated at 188 and 189, extend upwardly and rearwardly from the housings 40 and 56, respectively. A housing 190 is formed as an extension of the housing 40, and a housing 191 is formed as an extension of the housing 56. At their upper ends the housings 190 and 191 are provided with enlarged housings 192 and 193 within which a shaft 194 is positioned so as to extend completely through both the housing 192 and the housing 193. The shaft 194 is carried by an adjustable bearing block 195 on one end thereof and an adjustable bearing block 196 of similar construction on the other end thereof so that the shaft 194 may be moved to adjust conveyors 188 and 189. A shaft 197 is positioned in the housing 190 at the lower end thereof parallel to the shaft 83 and to the shaft 194. Shaft 197 is carried by bearings 198 and 199 at the opposite ends thereof. Shaft 197 is provided with a sprocket 200. A shaft 201 is positioned at the bottom of the housing 191, parallel to the shaft 102 and spaced apart therefrom. Bearings 202 and 203 position the shaft 201 within the housing 191 for rotation therein. A sprocket 204 is mounted on the shaft 201 for rotation therewith. The shaft 194 is provided with a pair of sprockets (not shown) in alignment with the sprockets 200 and 204. The conveyor 188 is provided with a conveyor chain 205 and a multiplicity of flights 206. The flights 206 are in engagement with the inner upper face of the housing 190 along the rear portion of the conveyor 188 so that material can be moved upwardly through the housing 190 by means of the flights 206. The chain 205 is trained over the sprocket 200 on the shaft 197 and a similar sprocket (not shown) on the shaft 194. The conveyor 189 is provided with a sprocket chain 207 which is trained over the sprocket 204 and a similar sprocket (not shown) on the shaft 194. The chain 207 is provided with a multiplicity of flights 208 which are in engagement with the upper face of the lower wall of the housing 191 so that material may be moved upwardly in the housing 191 by means of the flights 208.

The housings 192 and 193 are supported in their spaced apart upper ends by means of braces 209 and 210 which extend from the rear cross member 29 to the housings 192 and 193. A sprocket 211 is mounted on the shaft 194 between the housings 192 and 193, and a shaft 212 is secured to the rear outer surface of the housing 192 by means of brackets 213 and 214. Shaft 212 is provided with a sprocket 215 at one end thereof and a pulley 216 at the other end thereof. A drive chain 217 is trained over the sprocket 215 and the sprocket 211 so that the shaft 194 may be driven by the shaft 212. A sprocket 218 is secured to the outer end of the shaft 197, and a sprocket 219 is secured to the outer end of the shaft 83. A chain 220 is trained over the sprockets 218 and 219 so that the shaft 83 may be driven from the shaft 197 which is in turn driven from the shaft 194 by the chain 205. The shaft 201 is provided with a sprocket 221, and the shaft 102 is provided with a sprocket 222 and a chain 223 is trained over sprockets 221 and 222 so that the shaft 102 may be driven from the shaft 201 which is in turn driven from the shaft 194 by the chain 207.

The housings 192 and 193 are provided with a common outlet 224 along the lower rear portion thereof. A bracket 225 is carried by the housing 192 and rotatably supports a pair of idler pulleys 226 and 227 in vertically spaced apart aligned relation. A bracket 228 is mounted to extend vertically from the rear cross member 29, and a second bracket 229 is mounted on the rear cross member 29 in spaced apart relation to the bracket 228. A shaft 230 is mounted between the brackets 228 and 229 and carries a sprocket 231 and a sprocket 232 thereon. A bracket 233 is secured to the cross member 29 and carries an idler pulley 234 in alignment with the pulley 232. Drive belt 235 is trained over the pulley 216, the idler pulleys 226 and 227, and pulley 231 so that the shaft 230 may be driven from the shaft 212. A belt 236 is trained over the pulley 232, the idler pulley 234 and the pulley 147 with the belt twisted, as illustrated in Figure 4, so that the drive shaft 107 may be driven from the shaft 230.

Extending rearwardly from the tubular cross member 158 are a pair of support arms 237 and 238 joined by the cross member 239 at their rear ends. A castor bean thresher, generally indicated at 240, is mounted on the support arms 237 and 238 with the intake 241 of the thresher 240 positioned below the outlet 224 of the housings 192 and 193.

A chaff discharge tube 242 extends from the upper portion of the thresher 240, and the discharge 243 is provided for the desirable material separated from the chaff in the threshing machine 240. The thresher 240 is of conventional construction and is provided with the usual thresher internal construction (not shown).

A gear box 244 is mounted beneath the tubular cross member 158 and is secured thereto by arms 245. A shaft 246 extends into the power takeoff 25 of the tractor 20 and is provided at its rear end with a universal joint 247 which is connected to the gears (not shown) in the gear box 244. A shaft 248 is connected to the gears (not shown) in the gear box 244 through a universal joint 249 at one end and through a universal joint 250 at the other end to the operating mechanism (not shown) of the thresher 240.

A cross shaft 251 is mounted above the gear box 244 by means of bearing brackets 252 and 253 and carries a pulley 254 on one end thereof and a pulley 255 on the other end thereof. A pulley 256 is mounted to an extension 257 of the gear box 244 with the pulleys 256 and 255 in alignment. An idler pulley 258 is mounted to the bearing bracket 253 so that the idler pulley 258 is in alignment with pulleys 255 and 256. A belt 259 is trained over the pulleys 255, 256 and 258 so that the shaft 251 may be driven from the pulley 256 which is in turn driven through the gear box 244 and power takeoff 25. A shaft 260 is secured through a universal joint 261 with a shaft 251 at one end and through a universal joint 262 to the shaft 212 at the other end so that the shaft 12 may be driven by the shaft 260 from the shaft 251.

An angle iron arm 263 extends rearwardly from the tubular cross member 158 and carries a tubular housing 264 for a screw conveyor 265. The housing 264 extends at one end 266 under the outlet 243 of the thresher 240, and is connected thereto so as to receive the discharge therefrom. The pulley 267 is secured to the shaft 268 of a conveyor 265 at the end opposite the thresher 240. A discharge spout 269 is positioned on the housing 264 and the material conveyed by the conveyor 265 is discharged through the spout 269. Gear box 244 is provided with a lateral extension 270 having a pulley 271 mounted in the outer end thereof. A belt 272 is trained over the pulleys 267 and 271 so that the shaft 268 may be driven from the pulley 271.

A bifurcated housing 273 is secured to the axle 21 and extends upwardly therefrom. The housing 273 is provided with a front portion 274 and a rear portion 275 with a shaft 276 mounted in the lower joint portion 277 midway between the forward portion 274 and the rear portion 275. A pulley 278 is mounted on the shaft 276 in alignment with the pulley 254 on the shaft 251. A belt 279 is trained over the pulley 254 and the pulley 278 so that the shaft 276 may be driven from the shaft 251. The upper portion of the housing 273 is provided with a joint portion 280 and a discharge spout 281. A shaft 282 is mounted transversely of the joint portion 280 of the housing 273 on adjustable bearing blocks 283 and 284. The shafts 276 and 282 are parallel to each other and carry sprockets (not shown) on which are mounted a conveyor chain 285 having spaced flights 286 secured thereto. Conveyor chain 285 is driven by the shaft 276.

A chute 287 is secured to the housing 273 at the forward end and slopes upwardly and rearwardly in a position beneath the discharge spout 269 at the rear end where it is secured by means of a bracket 288 extending from the discharge spout 269 of the conveyor housing 264. Material discharged from the thresher 240 through the discharge opening 243 is conveyed through the housing 264 by means of the conveyor 265 and discharged into the chute 287. The material is gravity fed through the chute 287 into the housing 273 where it is conveyed upwardly to the upper portion 280 and discharge spout 281. A rubber shoe 289 is secured to the outlet of the discharge spout 281 so as to provide a flexible extension therefor for reasons to be assigned.

A pair of brackets 290 and 291 are secured to the frame 24 of the tractor 20 and extend laterally thereof. Longitudinal horizontal member 292 is secured in the brackets 290 and 291 at the opposite ends thereof, and a pair of outwardly and upwardly extending cantilever members 293 and 294 are secured at their lower ends to the longitudinal member 292. A hopper 295 having a frame 296 is secured by means of a quadrant 297 and a pivot 298 to the upper end of the member 293 at one side thereof and to the member 294 at the other side thereof through a quadrant 299 and a pivot 300. A bar 301 extends between the members 293 and 294 to support the hopper 295 in horizontal position. The outer curved edge 302 of the quadrant 297 is grooved, as indicated at 303, and has a cable 304 extending therethrough and secured to a link 305 at its upper extremity. The quadrant 299 is identical to the quadrant 297 and has a cable 306 extending therethrough from a link 307. The cable 304 is trained over an idler pulley 308 secured to the longitudinal member 292, and the cable 306 is trained over an identical idler pulley (not shown) mounted on the longitudinal member 292. The rear ends of the cables 304 and 306 are joined to the outer end of a piston rod 309 extending from a hydraulic cylinder 310 so that inward movement of the piston rod 309 into the cylinder 310 will pull the cables 304 and 306, rotating the hopper 295 about the pivots 298 and 300 to dump the hopper 295 into a vehicle positioned therebeneath.

As can be seen in Figure 1, the rubber shoe 289 extends over the edge of the hopper 295 and upon dumping of the hopper 295, the shoe 289 is displaced by contact with the hopper 295. Obviously the shoe 289 permits movement of the hopper 295 without damage to the discharge spout 281.

The offset wall 50 and the screen 52 extending outwardly to the rear edge thereof on the harvester portion 26 of the invention, provides the operator of the tractor 20 with a direct line of sight to permit him to view the front of the harvester 26 so that he can guide the harvester 26 with relation to the plants from which beans are to be harvested.

In the use and operation of the invention, the structure will be described as related to castor bean plants and the harvesting of castor beans therefrom, although it should be understood that the device is adaptable to the harvesting of other materials from their plants. It has long been the practice in the castor bean industry to await the natural drying out of the plant or the application of some material to defoliate or kill the plant. At this time the plant is fed complete into a harvesting machine which completely destroys the plant structure while removing the castor beans therefrom. Obviously the castor beans will not all have the same maturity under such conditions and the yield therefrom will not be at its maximum.

The instant invention is adapted to be used to remove mature castor beans from the plant while the plant is still alive without injury to the plant so that immature beans may have the opportunity to continue to grow to become mature beans.

To harvest the beans with the instant invention, the tractor 20 is driven through the rows of castor bean plants with the housings 40 and 56 equally spaced on opposite sides of a single row of plants. Upon forward motion of the machine under these conditions, the trunk of the plant will pass between the resilient plates 148 and the resilient plates 152, lifting these plates sufficiently for the trunk of the plant to pass therebetween. As the machine moves further forwardly, the knockers 117 and 121 will be brought in rapid contact with the trunk of the castor bean plant, establishing a vibration in the plant sufficient to dislodge the mature castor beans therefrom. As soon as the knockers 117 or 121 strikes the castor bean plant trunk, the connecting rod 122 or 144, respectively, will yield so as to prevent further movement of the knockers 117 and 121 and hence damage to the plant or the knockers 117 and 121.

The castor beans falling from the castor bean plant will be contained within the side walls of the harvester 26 and caught by the housings 40 and 56 so as to be directed rearwardly by means of the conveyor flights 87, 91, 100 and 105. Castor beans falling on the resilient plates 148 and 152 will be directed into either the housing 40 or housing 56 due to the outward slope of the resilient plates 148 and 152. Thus it can be seen that practically all of the area beneath the castor bean plant being vibrated is in a position to collect the beans dropping from the plant and practically no beans will be lost. Beans discharged at the rear of the housings 40 and 56 by the conveyors therein are moved upwardly in the housing 190 and 191 by the conveyors 188 and 189 where they are discharged into the threshing separator 240. The threshing separator discharges the beans into the conveyor 265 from which they are discharged into the chute 287 leading to the housing 273. The beans are then elevated to the discharge spout 281. The hopper 295 receives the beans from the discharge spout 281 and is adapted to be dumped into a wagon or truck as it becomes filled. The chaff leading from the chaff discharge 242 can be collected in a vehicle towed by the tractor 20 or left on the ground as desired.

The outrigger 172 being pivoted at 173 will follow the contours of the ground underlying the wheel 175 and due to the connection of the outrigger 172 to the framework of the harvester 26, the harvester 26 will be raised and lowered with relation to the tractor 20 in order to be spaced a standard amount from the ground surface. Should it be desirable to raise or lower the harvester 26 with relation to the ground level when harvesting crops from plants of differing heights, the hydraulic cylinder 177 may be operated from the hydraulic control of the tractor 20 to raise or lower the harvester 26 as desired.

Having thus described the preferred embodiment of the invention, it should be understood that numerous modifications and structural adaptations may be resorted to without departing from the scope of the appended claims.

What is claimed is:

1. A combination tractor attached harvester thresher comprising a laterally extending frame detachably secured to said tractor, a vertically adjustable frame secured to said laterally extending frame, means on said laterally extending frame engaging the ground for spacing said vertically adjustable frame from the ground, horizontally oscillating plant striking members mounted on said vertically adjustable frame, an upright shaft mounted on said vertically adjustable frame driven by said tractor, crank throws formed on said upright shaft, means yieldable connecting said striking members to said crank throws for oscillating said members, a housing on said vertically adjustable frame extending under said members for collecting the crop dislodged from said plant, a thresher mounted on said laterally extending frame, means on said laterally extending frame driven by said tractor for operating said thresher, a conveyor system on said vertically adjustable frame for conveying the harvested crop to said thresher, a crop storage bin on said tractor, and means on said laterally extending frame extending between said thresher and said crop storage bin for conveying the threshed crop from said thresher to said crop storage bin.

2. A device as claimed in claim 1, wherein said crop storage bin is substantially elevated above said tractor and is provided with means thereon whereby it may be dumped.

3. A device as claimed in claim 1, wherein said vertically adjustable frame is provided with hydraulic means for adjusting the height thereof with relation to the ground surface.

4. A device as claimed in claim 1, wherein said hydraulic means includes cable suspension members extending to said vertically adjustable frame.

References Cited in the file of this patent

UNITED STATES PATENTS

| | | |
|---|---|---|
| 1,646,004 | Beckman | Oct. 18, 1927 |
| 1,926,388 | Jones | Sept. 12, 1933 |
| 1,931,471 | Jones | Oct. 17, 1933 |
| 1,977,784 | Urschel | Oct. 23, 1934 |
| 2,507,669 | Heth | May 16, 1950 |
| 2,587,553 | Ward | Feb. 26, 1952 |
| 2,656,667 | Smith et al. | Oct. 27, 1953 |
| 2,675,663 | Ward | Apr. 20, 1954 |
| 2,700,857 | Stearman | Feb. 1, 1955 |